(12) United States Patent
Cai et al.

(10) Patent No.: US 9,030,958 B2
(45) Date of Patent: May 12, 2015

(54) LTE DOWNLINK CONTROL CHANNEL RESOURCE ALLOCATION METHOD AND BASE STATION

(75) Inventors: Wanjie Cai, Shenzhen (CN); Jianhong Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 67 days.

(21) Appl. No.: 13/819,986

(22) PCT Filed: Jun. 20, 2011

(86) PCT No.: PCT/CN2011/075998
§ 371 (c)(1),
(2), (4) Date: Feb. 28, 2013

(87) PCT Pub. No.: WO2012/031495
PCT Pub. Date: Mar. 15, 2012

(65) Prior Publication Data
US 2013/0155997 A1    Jun. 20, 2013

(30) Foreign Application Priority Data

Sep. 10, 2010    (CN) .......................... 2010 1 0279852

(51) Int. Cl.
*H04W 24/00* (2009.01)
*H04W 72/04* (2009.01)
*H04W 72/12* (2009.01)

(52) U.S. Cl.
CPC .......... *H04W 72/04* (2013.01); *H04W 72/1226* (2013.01)

(58) Field of Classification Search
USPC .................................................. 370/252, 329
See application file for complete search history.

(56) References Cited

U.S. PATENT DOCUMENTS

| 2010/0157922 | A1* | 6/2010 | Kim et al. ...................... 370/329 |
| 2011/0286413 | A1* | 11/2011 | Nishio et al. .................. 370/329 |
| 2011/0310817 | A1* | 12/2011 | Okubo et al. .................. 370/329 |
| 2012/0051306 | A1* | 3/2012 | Chung et al. .................. 370/329 |
| 2012/0275428 | A1* | 11/2012 | Feng et al. ..................... 370/330 |
| 2012/0327917 | A1* | 12/2012 | Yang et al. ..................... 370/336 |
| 2013/0083751 | A1* | 4/2013 | Papasakellariou et al. ... 370/329 |
| 2013/0114929 | A1* | 5/2013 | Nara ............................... 385/37 |
| 2013/0294366 | A1* | 11/2013 | Papasakellariou et al. ... 370/329 |

(Continued)

FOREIGN PATENT DOCUMENTS

| CN | 101212410 A | 7/2008 |
| CN | 101801090 A | 8/2010 |

(Continued)

OTHER PUBLICATIONS

International Search Report (Form PCT/ISA/210) for PCT/CN2011/075998, mailed Sep. 29, 2011.

*Primary Examiner* — Andrew Lee
(74) *Attorney, Agent, or Firm* — Koppel, Patrick, Heybl & Philpott (57) ABSTRACT

A LTE downlink control channel resource allocation method and base state are provided. A base station sends resource scheduling information to a physical layer via a MAC layer; the search space to which resources to be allocated belong is determined according to the scheduling information; when the resources to be allocated belong to dedicated search space of a UE, resources of the current downlink channel are allocated according to the quality level of the current downlink channel.

13 Claims, 5 Drawing Sheets

(56) References Cited

U.S. PATENT DOCUMENTS

2014/0133367 A1* 5/2014 Chen et al. .................. 370/279
2014/0192918 A1* 7/2014 Park et al. .................. 375/267

FOREIGN PATENT DOCUMENTS

| CN | 101801095 A | 8/2010 |
| CN | 101801097 A | 8/2010 |

* cited by examiner

LTE DOWNLINK CONTROL CHANNEL RESOURCE ALLOCATION METHOD AND BASE STATION

FIELD OF THE INVENTION

The disclosure relates to the field of wireless communication, and in particular to a Long Term Evolution (LTE) downlink control channel resource allocation method and base station.

BACKGROUND OF THE INVENTION

The Physical Downlink Control Channel (PDCCH) is a very important downlink physical channel in the LTE system. The channel transmits downlink control information which can be used for scheduling the Physical Uplink Shared Channel (PUSCH) of the User Equipment (UE) and allocating occupied resources thereof. And, the PDCCH can also be used for informing the UE of the modulation mode of related service data, resource occupation condition etc. on the Physical Downlink Shared Channel (PDSCH). Thus, the UE can receive and decode service data correctly. The number of the Orthogonal Frequency Division Multiplexing (OFDM) symbols that the PDCCH can occupy is determined by content transmitted through the Physical Control Format Indicator Channel (PCFICH). If there is Hybrid Automatic Repeat Request (HARQ) information, part of the resources determined by PCFICH is occupied by the Physical Hybrid-ARQ Indicator Channel (PHICH), and only the rest resources are used for the PDCCH.

The LTE protocol specifies that the resources occupied by PDCCH are allocated by using the Control Channel Element (CCE) as the basic unit. In the end, the CCE is mapped to specific physical resources. Meanwhile, the protocol further specifies a corresponding relationship among PDCCH format, number of CCEs, number of Resource-Element Groups (REG) and number of PDCCH bits. However, the protocol does not specify the corresponding relationship among Downlink Control Information (DCI) format of PDCCH, CCE etc. Thus, the PDCCH resource allocation method in the related art cannot utilize the current resources reasonably, which affects the performance of entire system.

SUMMARY OF THE INVENTION

The disclosure provides a LTE downlink control channel resource allocation method and base station. The solution of the disclosure can reasonably allocates PDCCH resources to improve the utilization rate of downlink resources and improve performance of the system.

The disclosure provides a LTE downlink control channel resource allocation method, comprising the following steps:

sending, by a base station, resource scheduling information to a physical layer via a Media Access Control (MAC) layer;

determining a search space to which resources to be allocated belong according to the resource scheduling information; and allocating the resources of a current downlink channel according to a quality level of the current downlink channel, when the resources to be allocated belong to a dedicated search space of a User Equipment (UE).

Preferably, after the step of determining the search space to which the resources to be allocated belong according to the scheduling information, the method further comprises:

allocating the resources of the current downlink channel according to a default Control Channel Element (CCE) allocation value of a common search space, when the resources to be allocated belong to the common search space.

Preferably, allocating the resources of the current downlink channel according to the quality level of the current downlink channel comprises:

if the quality level of the current downlink channel is a first predetermined level, setting a current CCE allocation value of the current downlink channel in a manner of decreasing progressively in preset time to allocate the resources, based on a CCE allocation value to which the quality level of the current downlink channel corresponds, wherein the current CCE allocation value is greater than or equal to the minimum threshold; and if the quality level of the current downlink channel is a second predetermined level, setting the current CCE allocation value of the current downlink channel in a manner of increasing progressively in preset time to allocate the resources, based on a default CCE allocation value of the dedicated search space of the UE or the CCE allocation value to which the quality level of the current downlink channel corresponds, wherein the current CCE allocation value is less than or equal to the maximum threshold.

Preferably, before the step of allocating the resources of the current downlink channel according to the quality level of the current downlink channel, the method further comprises:

obtaining the quality level of the current downlink channel according to a Channel Quality Indicator (CQI) index fed back by the UE.

Preferably, before the step of allocating the resources of the current downlink channel according to the quality level of the current downlink channel, the method further comprises:

obtaining the quality level of the current downlink channel according to a Block Error Ratio (BLER) of Hybrid Automatic Repeat Request (HARQ) transmission.

Preferably, before the step of allocating the resources of the current downlink channel according to the quality level of the current downlink channel, the method further comprises:

obtaining the quality level of the current downlink channel according to a measurement result of an uplink channel.

The disclosure further provides a LTE downlink control channel resource allocation base station, comprising an information sending module, a determining module and a resource allocating module, wherein the information sending module is configured to send resource scheduling information to a physical layer via a Media Access Control (MAC) layer;

the determining module is configured to determine a search space to which resources to be allocated belong according to the resource scheduling information; and the resource allocating module is configured to, when the resources to be allocated belong to a dedicated search space of a User Equipment (UE), allocate the resources of a current downlink channel according to a quality level of the current downlink channel.

Preferably, the resource allocating module is further configured to, when the resources to be allocated belong to a common search space, allocate the resources of the current downlink channel according to a default Control Channel Element (CCE) allocation value of the common search space.

Preferably, the resource allocating module comprises:

a resource allocating unit, configured to, if the quality level of the current downlink channel is a first predetermined level, set a current CCE allocation value of the current downlink channel in a manner of decreasing progressively in preset time to allocate the resources, based on a CCE allocation value to which the quality level of the current downlink channel corresponds, wherein the current CCE allocation value is greater than or equal to the minimum threshold; and if the quality level of the current downlink channel is a second predetermined level, set the current CCE allocation value of the current downlink channel in a manner of increasing progressively in preset time to allocate the resources, based on a default CCE allocation value of the dedicated search space of the UE or the CCE allocation value to which the quality level of the current downlink channel corresponds, wherein the current CCE allocation value is less than or equal to the maximum threshold.

Preferably, the resource allocating module further comprises:

a quality obtaining unit, configured to obtain the quality level of the current downlink channel according to a Channel Quality Indicator (CQI) index fed back by the UE or a Block Error Ratio (BLER) of Hybrid Automatic Repeat Request (HARQ) transmission or a measurement result of an uplink channel.

The disclosure provides a LTE downlink control channel resource allocation method and base station. This solution can obtain the quality level of downlink channels through CQI fed back by the UE or BLER of HARQ or measurement result of the uplink channel, when quality level of downlink channels is unknown. And, this solution can dynamically and reasonably allocate PDCCH resources, that is, set a reasonable CCE allocation value (number) for the downlink channel, according to quality of the downlink channel. Thereby, this solution improves receiving and transmitting efficiency of the PDCCH, ensures uplink and downlink traffic, and improves PDCCH resource allocation efficiency and flexibility. Also, this solution increases the probability that the UE successfully parses the PDCCH and the PDSCH, improves reasonable utilization rate of downlink resources, and reduces number of symbols occupied by the PDCCH, namely the value of PCFICH. Thus, more symbols can be reserved for downlink service transmission, or more users are scheduled based on originally occupied control channel resources. That is, more users are scheduled without reducing the number of symbols occupied by PDCCH. Therefore, on the other hand, this solution improves performance of the entire system and increases capacity of the system.

To make the technical solutions of the disclosure more clear, the disclosure is described hereinafter with reference to the drawings.

DETAILED DESCRIPTION OF THE EMBODIMENTS

The solution of embodiment of the disclosure is mainly to dynamically and reasonably allocate PDCCH resources, that is, to set a reasonable CCE allocation value (number) for the downlink channel, according to the quality of the downlink channel. When the quality of the downlink channel is unknown, the quality level of downlink channels is obtained through the CQI fed back by the UE or the BLER of HARQ or the measurement result of the uplink channel. This solution improves PDCCH resource allocation efficiency and flexibility.

Figure 1:
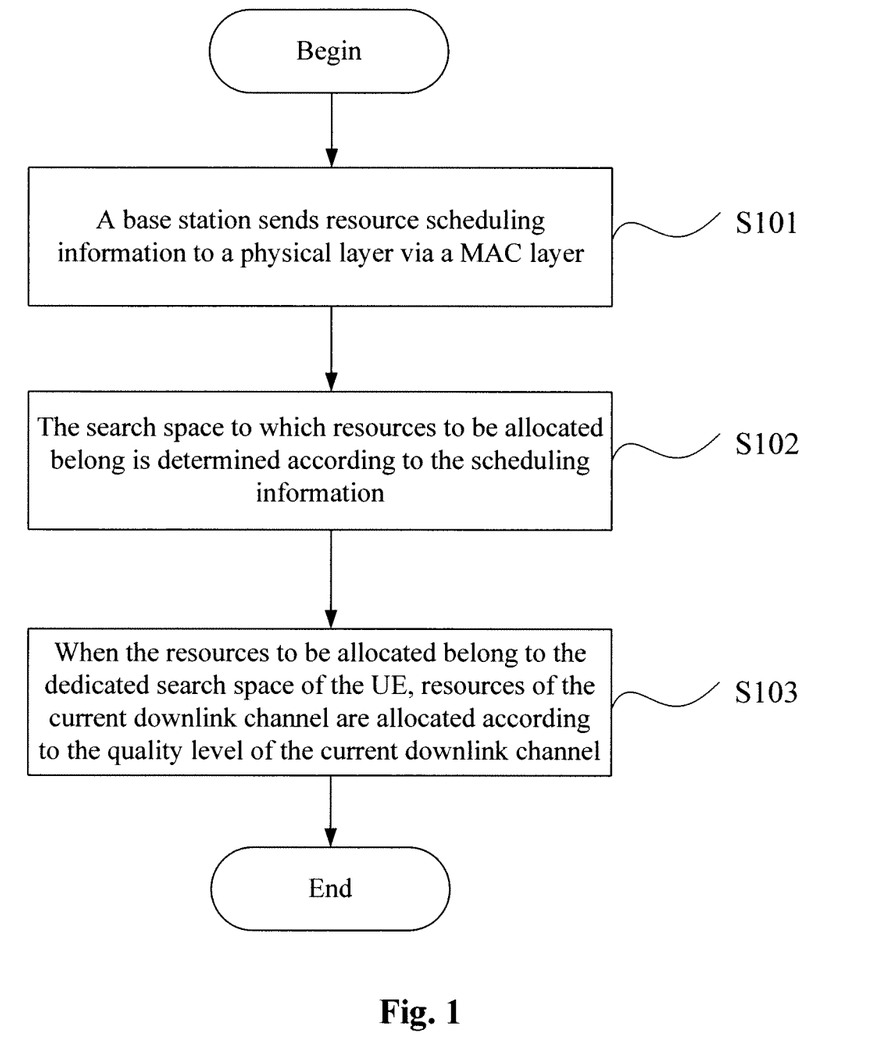
FIG. 1 shows a flowchart of the LTE downlink control channel resource allocation method according to an embodiment of the disclosure.

As shown in FIG. 1, an embodiment of the disclosure provides a LTE downlink control channel resource allocation method, which includes the following steps.

Step S101: the base station sends resource scheduling information to the physical layer via the MAC layer.

Step S102: the search space to which the resources to be allocated belong is determined according to the scheduling information.

In above Step S101 and Step S102, when the base station allocates channel resources, the MAC layer of the base station sends the high layer signalling including the resource scheduling information to the physical layer. Related resources are allocated according to the scheduling information. When there are resources of downlink control channel to be allocated, first it is determined whether the search space to which the resources to be allocated belong is the common search space or the dedicated search space of UE, so as to correspondingly allocate resources of corresponding search space. In this case, the scheduling information includes initial default CCE value in downlink channels and UE information. With the scheduling information, it can be determined that whether the user accesses the base station system. If user has accessed the base station system, it can be determined that the resources to be allocated belong to the dedicated search space of UE. Otherwise, it can be determined that the resources to be allocated belong to the common search space. Information transmitted in the common search space mainly includes: paging, random access response, system broadcast etc.

When there are resources of downlink control channel to be allocated, first, it is needed to determine whether the search space to which the resources to be allocated belong is the common search space or the dedicated search space of UE. If it is the common search space, because of its particularity, the number of CCEs (which is called the CCE allocation value in this embodiment) allocated for PDCCH resource is required to be not less than a threshold of the common search space. The threshold can be set to be 4 or 8. If it is the dedicated search space of UE, resources are allocated according to the following step S103.

Step S103: when the resources to be allocated belong to the dedicated search space of UE, the resources of the current downlink channel are allocated according to the quality level of the current downlink channel.

In the embodiment, when the resources to be allocated belong to the dedicated search space of UE, the resources of the current downlink channel can be allocated according to the quality level of the current downlink channel. The base station can periodically require the UE to feed back CQI index information according to need or a predetermined strategy. The base station can get the quality condition of the downlink channel, namely the quality level in this embodiment, according to the CQI index information fed back by the UE. Likewise, it may be that the base station does not periodically require the UE to feed back CQI index information according to a predetermined strategy, so as to avoid resource occupation and to save resource space. Thus, the quality level of the current downlink channel may be known or unknown. If quality level of the current downlink channel is known, resources can be allocated according to the quality level of the current downlink channel. If quality level of the current downlink channel is unknown, it is required to obtain the quality level of the current downlink channel, and then resources are allocated according to the quality level of the current downlink channel.

Figure 2:
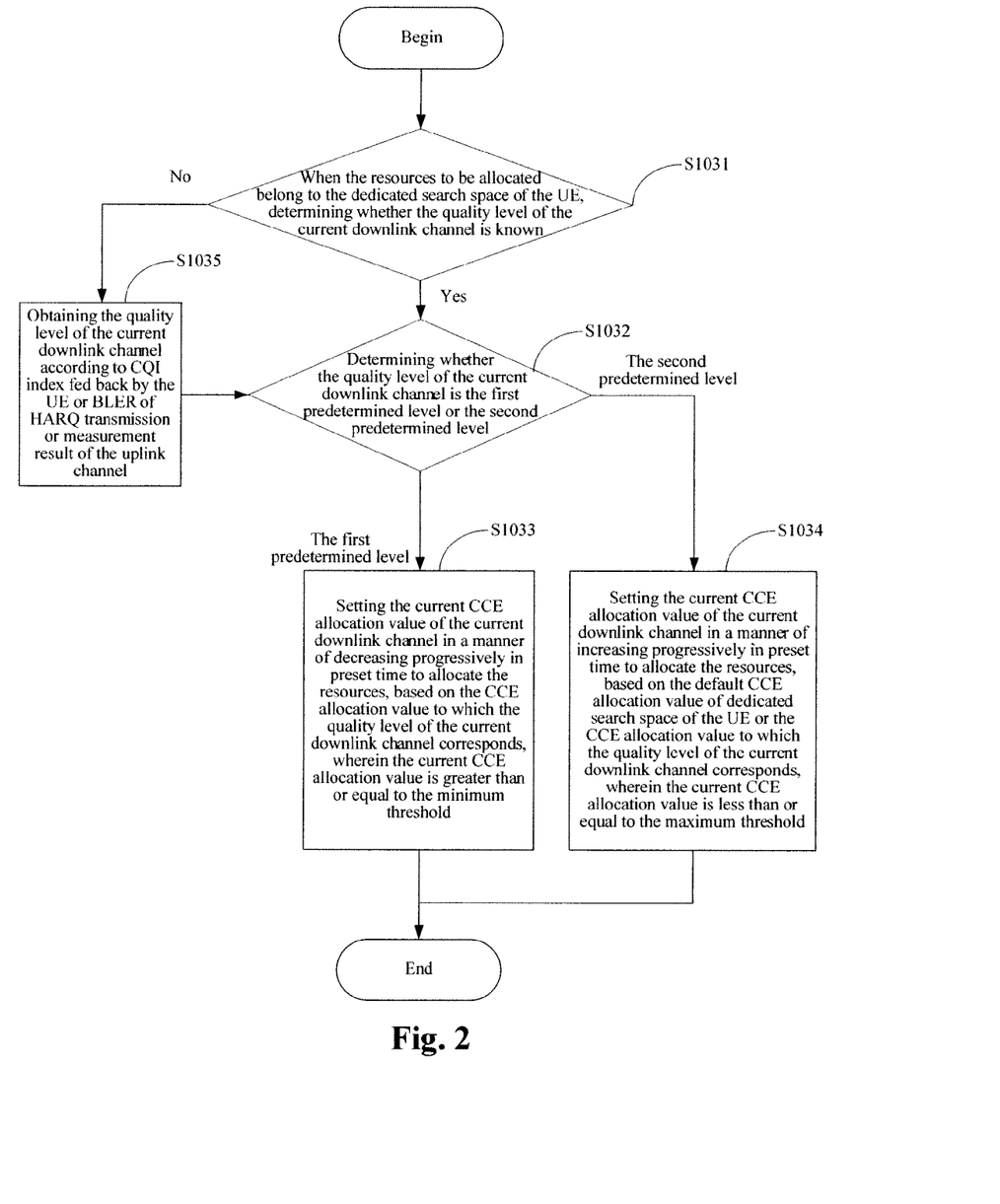
FIG. 2 shows a specific flowchart of allocating resources of the current downlink channel according to the quality level of the current downlink channel, when the resources to be allocated belong to the dedicated search space of UE, of the LTE downlink control channel resource allocation method according to an embodiment of the disclosure.

As shown in FIG. 2, step S103 can further comprises the following steps.

Step S1031: when the resources to be allocated belong to the dedicated search space of UE, determining whether the quality level of the current downlink channel is known; and if yes, entering step S1032, otherwise, entering step S1035.

Step S1032: determining whether the quality level of the current downlink channel is the first predetermined level or the second predetermined level; and if it is the first predetermined level, entering step S1033, otherwise, entering Step S1034.

In this embodiment, the quality level of downlink channels is divided into the first predetermined level and the second predetermined level. If it is the first predetermined level, it indicates that the quality of the downlink channel is good or excellent. The corresponding CCE allocation value is 1 or 2. If it is the second predetermined level, it indicates that the quality of the downlink channel deteriorates or is not good. The corresponding CCE allocation value is 4. In the following process of obtaining the quality level of the current downlink channel, the corresponding relationship between the quality level of the downlink channel and the CCE is described in detail with reference to FIG. 3.

Step S1033: setting the current CCE allocation value of the current downlink channel in a manner of decreasing progressively in preset time to allocate the resources, based on the CCE allocation value to which the quality level of the current downlink channel corresponds, wherein the current CCE allocation value is greater than or equal to the minimum threshold.

Step S1034: setting the current CCE allocation value of the current downlink channel in a manner of increasing progressively in preset time to allocate the resources, based on the default CCE allocation value of the dedicated search space of the UE or the CCE allocation value to which the quality level of the current downlink channel corresponds, wherein the current CCE allocation value is less than or equal to the maximum threshold.

Step S1035: obtaining the quality level of the current downlink channel according to the CQI index fed back by the UE or the BLER of HARQ transmission or the measurement result of the uplink channel; and entering step S1032.

In the above, the process of obtaining the quality level of the current downlink channel according to the CQI index fed back by the UE is as follows.

Figure 3:
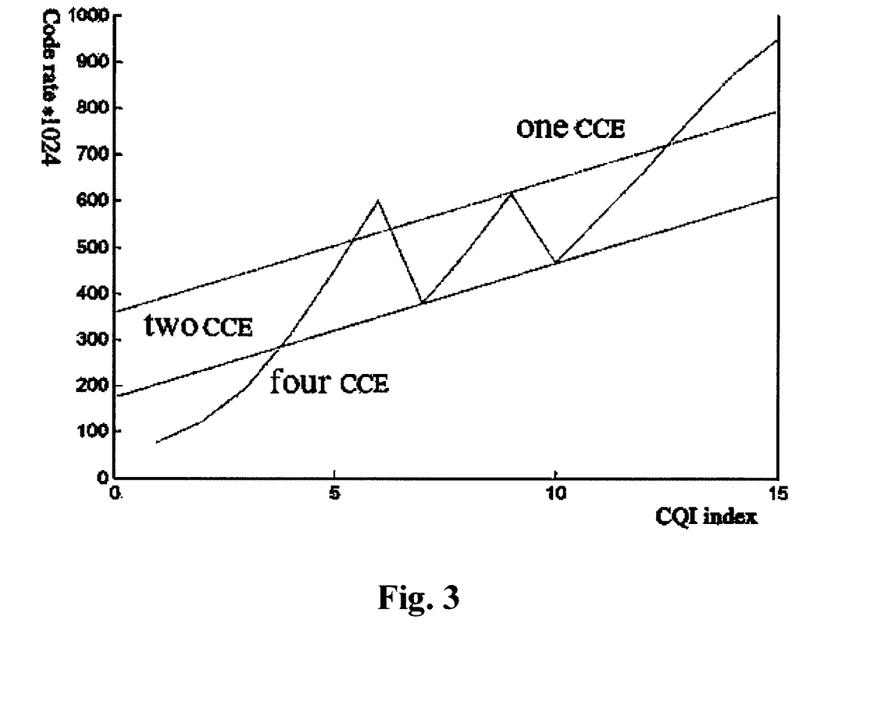
FIG. 3 shows a mapping relationship among CQI index, code rate×1024 and the CCE allocation value in the LTE downlink control channel resource allocation method according to an embodiment of the disclosure.

FIG. 3 shows a mapping relationship between the CQI and the CCE allocation value. The LTE protocol specifies that value of CQI index is 0 to 15. The corresponding relationship among the CQI index, the modulation mode and the code rate is shown in Table 1. The corresponding relationship between the CQI index and code rate×1024 can be obtained according to Table 1. Table 2 shows a corresponding relationship among PDCCH format, number of CCEs, number of REGs and number of PDCCH bits. It can be seen from Table 2 that the number of CCEs can be 1, 2, 4 and 8. Table 3 shows the maximum number of bits of information occupied by different DCI formats. With the subsequent updating of the LTE protocol, the method is not limited because of the change of DCI format and its maximum number of bits. As shown in Table 3, because the maximum number of bits of DCI is 57, and the number of bits of a CCE is 72, 64/72×100%=88.9% (57 bits are aligned to 64). This 88.9% is less than the code rate of 93% specified by the protocol. Therefore, FIG. 3 is divided into 3 areas according to Table 1, Table 2 and Table 3. The 3 areas correspond to three quality levels, namely good, medium and poor respectively. The 3 areas give values of the number of CCEs Numcce respectively, so that the base station side can obtain the corresponding number of CCEs Numcce, namely the CCE allocation value, according to the CQI index fed back by the UE. Thus, the dynamic allocation of PDCCH CCE resources can be implemented according to channel quality. The corresponding relationship of the CQI index Idxcqi and the number of CCEs Numcce are as follows:

if Idxcqi={1, 2, 3}, then Numcce=4;

if Idxcqi={4, 5, 7, 8, 10, 11, 12}, then Numcce=2; and if Idxcqi={6, 9, 13, 14, 15}, then Numcce=1.

In the above, when the value of Numcce is 1 or 2, the corresponding quality level of downlink channel is the first predetermined level. When the value of Numcce is 4, the corresponding quality level of downlink channel is the second predetermined level. For the situation that Numcce is equal to 8, it is reserved for the common search area to use.

TABLE 1 the corresponding relationship among CQI, modulation mode and code rate

| CQI index | Modulation mode | Code rate × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2 the corresponding relationship among PDCCH format, CCE num, REG num and PDCCH bit Num

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

TABLE 3 the maximum number of bits of information
occupied by different DCI formats

| DCI format | Number of DCI maximum bits |
|---|---|
| 0 | 31 |
| 1 | 42 |
| 1A | 41 |
| 1B | 35 |
| 1C | 15 |
| 1D | 35 |
| 2 | 57 |
| 2A | 53 |
| 3 | 31 |
| 3A | 31 |

The process of obtaining the quality level of the current downlink channel according to the BLER of HARQ transmission is:

determining the BLER of HARQ transmission according to statistical information of ACK per second (Num_ack) and statistical information of NACK per second (Num_nack) of HARQ at the base station side, so as to determine allocation of the number of CCEs of the PDCCH. The result of computation is as follows:

if (Num_nack/(Num_nack+Num_ack))×100% is less than 5%, it is considered that the quality of the downlink channel is excellent, and then Numcce is equal to 1;

if (Num_nack/(Num_nack+Num_ack))×100% is more than 5% and less than 10%, it is considered that the quality of the downlink channel is good, and then Numcce is equal to 2;

otherwise, it is considered that the quality of the downlink channel deteriorates, and then Numcce is equal to 4.

In the above, when the value of Numcce is 1 or 2, the corresponding quality level of downlink channel is the first predetermined level, and when the value of Numcce is 4, the corresponding quality level of downlink channel is the second predetermined level. The resources with 8 CCEs are reserved for the common search area to use.

The process of obtaining the quality level of the current downlink channel according to a measurement result of an uplink channel is as follows:

the uplink PHY reports the Signal to Interference plus Noise Ratio (SINR) according to RBG. The uplink PHY reports a SINR for every 4 RBGs, computes an average value SINR_avg for the SINRs of all the RBGs of TSINR in given time, and then obtains SINR_db=10×log (SINR_avg/512) as the first SINR reference value SINR_init. And, the BLER to which the SINR_init corresponds is BLER_init. In the above, if BLER_init is more than 0 and less than 10%, it is considered that the quality of the downlink channel is good, and then Numcce is equal to 2;

if (BLER_TSINR-BLER_init) obtained in subsequent time of n TSINRs is more than 0, it is considered that the quality of the downlink channel deteriorates, and then Numcce is equal to 4; and if (BLER_TSINR-BLER_init) is less than 0, it is considered that the quality of the downlink channel is excellent, and then Numcce is equal to 1.

In the above, the TSINR time can be set according to the actual condition. When the value of Numcce is 1 or 2, the corresponding quality level of downlink channel is the first predetermined level. When the value of Numcce is 4, the corresponding quality level of downlink channel is the second predetermined level.

The above analysis indicates that: in all three methods for obtaining quality level of downlink channel, corresponding thresholds are set. If the set thresholds are exceeded and the quality of channel is regarded as good or excellent, the quality level of downlink channel is regarded as the first predetermined level. Under this situation, the current CCE allocation value of the current downlink channel is set in a manner of decreasing progressively in preset time to allocate the resources, based on the CCE allocation value to which the quality level of the current downlink channel corresponds, wherein the current CCE allocation value is greater than or equal to the minimum threshold. For example, if the number of CCEs Numcce sent last time is 2, the number of CCEs Numcce sent this time is 1, and the number of CCEs is required to be not less than the minimum threshold Mincce. If the channel quality is regarded as deteriorated or not good, the quality level of downlink channel is regarded as the second predetermined level. Under the situation, the current CCE allocation value of the current downlink channel is set in a manner of increasing progressively in preset time to allocate the resources, based on the default CCE allocation value of the dedicated search space of UE or the CCE allocation value to which the quality level of the current downlink channel corresponds, wherein the current CCE allocation value is less than or equal to the maximum threshold, so as to achieve optimal transmission efficiency of PDCCH. The rate of correctly decoding the PDCCH can be determined by observing that the UE parses the BLER of PDSCH, so that the transmission efficiency of PDCCH is obtained. For example, if the number of CCEs Numcce sent last time is 1, the number of CCEs Numcce sent this time is 2, and the number of CCEs Numcce is required to be not more than the maximum threshold Maxcce.

It needs to be noted that when obtaining the quality level of downlink channel by the above three methods, the base station can preferably select according to sequence of the CQI index fed back by the UE, the BLER of HARQ transmission and the measurement result of the uplink channel of the base station. That is, under the situation that the quality of the current downlink channel is unknown, the base station first determines whether the index fed back by the UE has been obtained. If yes, the base station obtains the quality level of the current downlink channel according to the CQI index fed back by the UE. Otherwise, the base station first determines whether the BLER of HARQ transmission has been known. If yes, the base station obtains the quality level of the current downlink channel according to the BLER of HARQ transmission. Or else, the base station obtains the quality level of the current downlink channel according to a measurement result of an uplink channel of the base station.

If the base station has obtained information of the quality of the downlink channel by the above three methods, that is, the base station knows the quality of the downlink channel according to the CQI index fed back by the UE, the BLER of HARQ transmission and the measurement result of the uplink channel of the base station, the channel quality can be comprehensively determined by a weight method. The weights of the three information are respectively Wue, Wbler and Wul, wherein Wue:Wbler:Wul=5:4:1. In this case, the three weights can be set flexibly according to the actual environment.

With the above methods, under the situation of different qualities of downlink channel, the number of CCEs can be dynamically allocated to downlink channel for transmitting DCI format. This solution ensures transmitting efficiency of PDCCH, increases the probability that the UE successfully parses the PDCCH and PDSCH, and improves reasonable utilization rate of downlink resources. Also, the solution reduces number of symbols occupied by PDCCH, namely the value of PCFICH. Thus, more symbols can be reserved for downlink service transmission, or more users are scheduled based on originally occupied control channel resources. That is, more users are scheduled without reducing the number of symbols occupied by PDCCH. Therefore, on the other hand, this solution improves performance of the entire system and increases capacity of the system.

Figure 4:
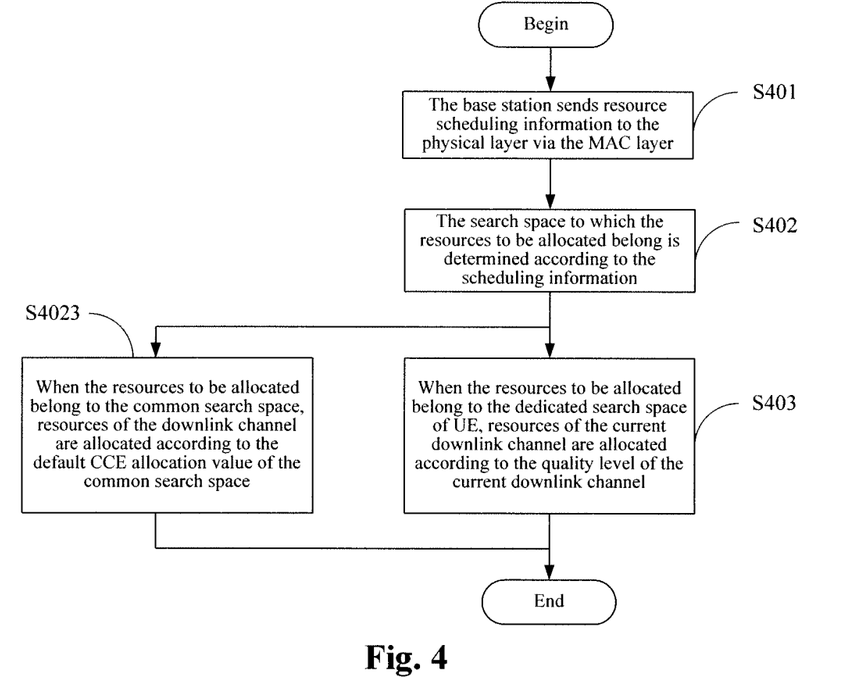
FIG. 4 shows a flowchart of the LTE downlink control channel resource allocation method according to another embodiment of the disclosure.

As shown in FIG. 4, another embodiment of the disclosure provides a LTE downlink control channel resource allocation method, comprising the following steps.

Step S401: the base station sends resource scheduling information to the physical layer via the MAC layer.

Step S402: the search space to which the resources to be allocated belong is determined according to the scheduling information.

Step S403: when the resources to be allocated belong to the dedicated search space of the UE, the resources of the current downlink channel are allocated according to the quality level of the current downlink channel.

The above step S401, step S402 and step S403 are the same as the corresponding step S101, step S102 and step S103 in the above embodiment. No repeated description is given here.

After step S402, this embodiment further comprises:

step S4023: when the resources to be allocated belong to the common search space, the resources of the downlink channel are allocated according to the default CCE allocation value of the common search space.

This embodiment can allocate corresponding resources according to the search space to which the resources to be allocated belong. When the resources to be allocated belong to the dedicated search space of UE, the embodiment can dynamically and reasonably allocate PDCCH resources, namely set the reasonable CCE allocation value (number) for the downlink channel, according to the quality of the downlink channel (the quality level of downlink channel is obtained through the CQI fed back by the UE or the BLER of HARQ or the measurement result of the uplink channel, when the quality of the downlink channel is unknown). Thereby, this solution improves receiving and transmitting efficiency of the PDCCH, ensures uplink and downlink traffic, and improves PDCCH resource allocation efficiency and flexibility. Also, this solution increases the probability that the UE successfully parses the PDCCH and the PDSCH, improves reasonable utilization rate of downlink resources, and reduces number of symbols occupied by the PDCCH, namely the value of PCFICH. Thus, more symbols can be reserved for downlink service transmission, or more users are scheduled based on originally occupied control channel resources. That is, more users are scheduled without reducing the number of symbols occupied by PDCCH. Therefore, on the other hand, this solution improves performance of the entire system and increases capacity of the system.

Figure 5:
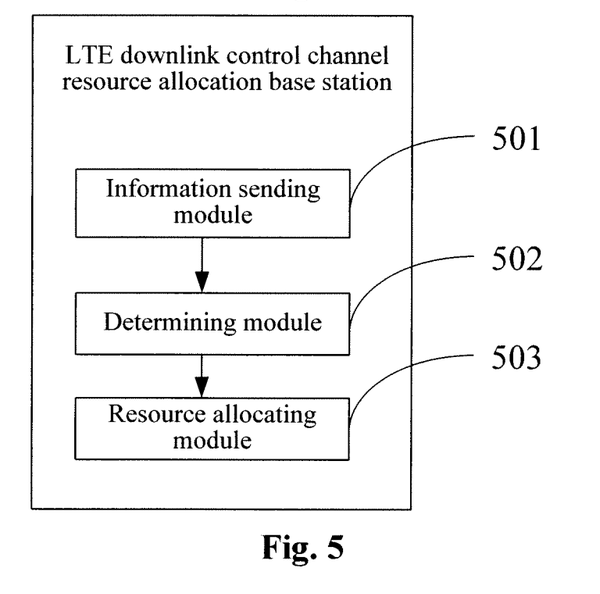
FIG. 5 shows a structure diagram of the LTE downlink control channel resource allocation base station according to an embodiment of the disclosure.

As shown in FIG. 5, an embodiment of the disclosure provides a LTE downlink control channel resource allocation base station, comprising the information sending module 501, the determining module 502 and the resource allocating module 503.

The information sending module 501 is configured to send resource scheduling information to the physical layer via the MAC layer.

The determining module 502 is configured to determine the search space to which resources to be allocated belong according to the scheduling information.

The resource allocating module 503 is configured to, when the resources to be allocated belong to the dedicated search space of UE, allocate resources of the current downlink channel according to the quality level of the current downlink channel.

In this embodiment, when the base station allocates channel resources, the MAC layer of the base station sends high layer signalling containing the resource scheduling information to the physical layer, and allocates related resources according to the scheduling information. When there are resources of downlink control channel to be allocated, first it is determined whether the search space to which the resources to be allocated belong is the common search space or the dedicated search space of UE, so as to correspondingly allocate resources of corresponding search space. In this case, the scheduling information includes the initial default CCE value in downlink channel and the UE information. With the scheduling information, it can be determined whether the user accesses the base station system. If the user has accessed the base station system, it can be determined that the resources to be allocated belong to the dedicated search space of UE. Otherwise, it can be determined that the resources to be allocated belong to the common search space. Information transmitted in the common search space mainly includes: paging, random access response, system broadcast etc.

When there are resources of downlink control channel to be allocated, first it needs to determine whether the search space to which the resources to be allocated belong is the common search space or the dedicated search space of UE. If it is the common search space, because of its particularity, the number of CCEs (which is called the CCE allocation value in this embodiment) allocated for PDCCH resource is required to be not less than the threshold of the common search space, wherein the threshold can be set to be 4 or 8. When the resources to be allocated belong to the dedicated search space of UE, the resources of the current downlink channel can be allocated according to the quality level of the current downlink channel.

Figure 6:
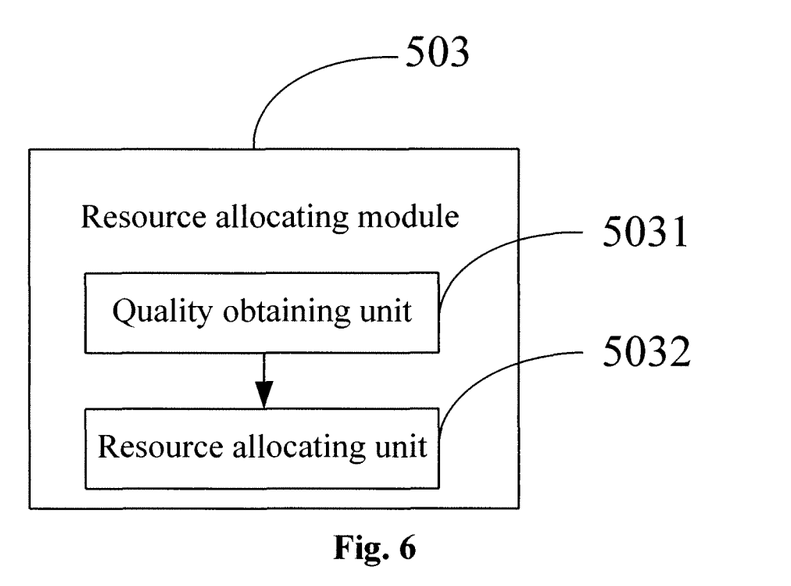
FIG. 6 shows a structure diagram of a resource allocating module of the LTE downlink control channel resource allocation base station according to an embodiment of the disclosure.

As shown in FIG. 6, the resource allocating module 503 comprises the resource allocating unit 5032, configured to, if the quality level of the current downlink channel is the first predetermined level, set the current CCE allocation value of the current downlink channel in a manner of decreasing progressively in preset time based on the CCE allocation value to which the quality level of the current downlink channel corresponds, wherein the current CCE allocation value is greater than or equal to the minimum threshold; and if the quality level of the current downlink channel is the second predetermined level, set the current CCE allocation value of the current downlink channel in a manner of increasing progressively in preset time, based on the default CCE allocation value of the dedicated search space of UE or the CCE allocation value to which the quality level of the current downlink channel corresponds, wherein the current CCE allocation value is less than or equal to the maximum threshold.

The resource allocating module 503 further comprises the quality obtaining unit 5031, configured to, when the quality level of the current downlink channel is unknown, obtain the quality level of the current downlink channel according to the CQI fed back by the UE or the BLER of HARQ or the measurement result of the uplink channel.

Furthermore, the resource allocating module 503 is further configured to, when the resources to be allocated belong to the common search space, allocate the resources of downlink channel according to the default CCE allocation value of the common search space.

It should be noted that in above embodiments, the quality level of downlink channel can be divided into different levels.

For example, it can be divided into 2 levels, namely the first predetermined level and the second predetermined level. If there are more than 2 levels, the processing is similar.

In the LTE downlink control channel resource allocation method and base station in embodiments of the disclosure, all different situations in the common search space and the dedicated search space of UE are considered. The solution can allocate corresponding resources according to the search space to which the resources to be allocated belong. When the resources to be allocated belong to the dedicated search space of UE, the LTE downlink control channel resource allocation method and base station can dynamically and reasonably allocate PDCCH resources. That is, the solution can set the reasonable CCE allocation value (number) for the downlink channel, according to the quality of the downlink channel. (The quality level of the downlink channel is obtained through the CQI fed back by the UE or the BLER of HARQ or the measurement result of the uplink channel, when quality of the downlink channel is unknown). Thereby, this solution improves receiving and transmitting efficiency of the PDCCH, ensures uplink and downlink traffic, and improves PDCCH resource allocation efficiency and flexibility. Also, this solution increases the probability that the UE successfully parses the PDCCH and the PDSCH, improves reasonable utilization rate of downlink resources, and reduces number of symbols occupied by the PDCCH, namely the value of PCFICH. Thus, more symbols can be reserved for downlink service transmission, or more users are scheduled based on originally occupied control channel resources. That is, more users are scheduled without reducing the number of symbols occupied by PDCCH. Therefore, on the other hand, this solution improves performance of the entire system and increases capacity of the system. Besides, the strategy of the solution aims at the resource allocation at the base station side, and does not require additional functions of the terminal.

The above is only the preferred embodiments of the disclosure, and is not intended to limit the scope of the disclosure. Any equivalent replacements of the structure or the flow based on the contents of the specification and drawings of the disclosure, or direct or indirect application of the equivalent replacements in other related technical fields shall fall within the scope of protection of the disclosure.

What is claimed is:

1. A Long Term Evolution (LTE) downlink control channel resource allocation method, comprising:
    sending, by a base station, resource scheduling information to a physical layer via a Media Access Control (MAC) layer;
    determining a search space to which resources to be allocated belong according to the resource scheduling information; and
    allocating the resources of a current downlink channel according to a quality level of the current downlink channel, when the resources to be allocated belong to a dedicated search space of a User Equipment (UE);
    wherein allocating the resources of the current downlink channel according to the quality level of the current downlink channel comprises:
    if the quality level of the current downlink channel is a first predetermined level, setting a current CCE allocation value of the current downlink channel in a manner of decreasing progressively in preset time to allocate the resources, based on a CCE allocation value to which the quality level of the current downlink channel corresponds, wherein the current CCE allocation value is greater than or equal to the minimum threshold; and
    if the quality level of the current downlink channel is a second predetermined level, setting the current CCE allocation value of the current downlink channel in a manner of increasing progressively in preset time to allocate the resources, based on a default CCE allocation value of the dedicated search space of the UE or the CCE allocation value to which the quality level of the current downlink channel corresponds, wherein the current CCE allocation value is less than or equal to the maximum threshold.

2. The method according to claim 1, wherein after determining the search space to which the resources to be allocated belong according to the scheduling information, the method further comprises:
    allocating the resources of the current downlink channel according to a default Control Channel Element (CCE) allocation value of a common search space, when the resources to be allocated belong to the common search space.

3. The method according to claim 1, wherein before allocating the resources of the current downlink channel according to the quality level of the current downlink channel, the method further comprises:
    obtaining the quality level of the current downlink channel according to a Channel Quality Indicator (CQI) index fed back by the UE.

4. The method according to claim 1, wherein before allocating the resources of the current downlink channel according to the quality level of the current downlink channel, the method further comprises:
    obtaining the quality level of the current downlink channel according to a Block Error Ratio (BLER) of Hybrid Automatic Repeat Request (HARQ) transmission.

5. The method according to claim 1, wherein before allocating the resources of the current downlink channel according to the quality level of the current downlink channel, the method further comprises:
    obtaining the quality level of the current downlink channel according to a measurement result of an uplink channel.

6. The method according to claim 1, wherein before allocating the resources of the current downlink channel according to the quality level of the current downlink channel, the method further comprises:
    obtaining the quality level of the current downlink channel according to a CQI index fed back by the UE.

7. The method according to claim 1, wherein before allocating the resources of the current downlink channel according to the quality level of the current downlink channel, the method further comprises:
    obtaining the quality level of the current downlink channel according to a BLER of HARQ transmission.

8. The method according to claim 1, wherein before allocating the resources of the current downlink channel according to the quality level of the current downlink channel, the method further comprises:
    obtaining the quality level of the current downlink channel according to a measurement result of an uplink channel.

9. A Long Term Evolution (LTE) downlink control channel resource allocation base station, comprising an information sending module, a determining module and a resource allocating module, wherein
    the information sending module is configured to send resource scheduling information to a physical layer via a Media Access Control (MAC) layer;
    the determining module is configured to determine a search space to which resources to be allocated belong according to the resource scheduling information; and the resource allocating module is configured to, when the resources to be allocated belong to a dedicated search space of a User Equipment (UE), allocate the resources of a current downlink channel according to a quality level of the current downlink channel;

wherein the resource allocating module comprises:

a resource allocating unit, configured to, if the quality level of the current downlink channel is a first predetermined level, set a current CCE allocation value of the current downlink channel in a manner of decreasing progressively in preset time to allocate the resources, based on a CCE allocation value to which the quality level of the current downlink channel corresponds, wherein the current CCE allocation value is greater than or equal to the minimum threshold; and if the quality level of the current downlink channel is a second predetermined level, set the current CCE allocation value of the current downlink channel in a manner of increasing progressively in preset time to allocate the resources, based on a default CCE allocation value of the dedicated search space of the UE or the CCE allocation value to which the quality level of the current downlink channel corresponds, wherein the current CCE allocation value is less than or equal to the maximum threshold.

10. The base station according to claim 9, wherein the resource allocating module is further configured to, when the resources to be allocated belong to a common search space, allocate the resources of the current downlink channel according to a default Control Channel Element (CCE) allocation value of the common search space.

11. The base station according to claim 9, wherein the resource allocating module further comprises:

a quality obtaining unit, configured to obtain the quality level of the current downlink channel according to a Channel Quality Indicator (CQI) index fed back by the UE or a Block Error Ratio (BLER) of Hybrid Automatic Repeat Request (HARQ) transmission or a measurement result of an uplink channel.

12. The base station according to claim 10, wherein the resource allocating module comprises:

a resource allocating unit, configured to, if the quality level of the current downlink channel is a first predetermined level, set a current CCE allocation value of the current downlink channel in a manner of decreasing progressively in preset time to allocate the resources, based on a CCE allocation value to which the quality level of the current downlink channel corresponds, wherein the current CCE allocation value is greater than or equal to the minimum threshold; and if the quality level of the current downlink channel is a second predetermined level, set the current CCE allocation value of the current downlink channel in a manner of increasing progressively in preset time to allocate the resources, based on a default CCE allocation value of the dedicated search space of the UE or the CCE allocation value to which the quality level of the current downlink channel corresponds, wherein the current CCE allocation value is less than or equal to the maximum threshold.

13. The base station according to claim 12, wherein the resource allocating module further comprises:

a quality obtaining unit, configured to obtain the quality level of the current downlink channel according to a CQI index fed back by the UE or a BLER of HARQ transmission or a measurement result of an uplink channel.

\* \* \* \* \*